United States Patent [19]

Fife

[11] Patent Number: 5,993,513
[45] Date of Patent: Nov. 30, 1999

[54] METHOD FOR CONTROLLING THE OXYGEN CONTENT IN VALVE METAL MATERIALS

[75] Inventor: James A. Fife, Reading, Pa.

[73] Assignee: Cabot Corporation, Boston, Mass.

[21] Appl. No.: 08/628,878

[22] Filed: Apr. 5, 1996

[51] Int. Cl.⁶ ........................................... B22F 1/00
[52] U.S. Cl. ........................... 75/743; 75/228; 75/245; 75/249; 75/343; 75/369; 148/513; 148/514; 148/577; 148/668
[58] Field of Search ............... 75/228, 245, 249, 75/343, 369; 148/513, 514, 577, 668; 419/30, 44; 420/427; 252/181.6; 428/660, 662, 663; 134/2, 3, 28

[56] References Cited

U.S. PATENT DOCUMENTS

| | | | |
|---|---|---|---|
| 3,190,822 | 6/1965 | Burnham | 204/141 |
| 4,017,302 | 4/1977 | Bates et al. | 75/0.5 |
| 4,483,819 | 11/1984 | Albrecht et al. | 419/2 |
| 4,512,805 | 4/1985 | Albrecht et al. | 75/244 |
| 4,722,756 | 2/1988 | Hard | 148/126.1 |
| 4,740,238 | 4/1988 | Schiele | 75/0.5 |
| 4,923,531 | 5/1990 | Fisher | 148/126.1 |
| 4,940,490 | 7/1990 | Fife et al. | 75/227 |
| 4,957,541 | 9/1990 | Tripp et al. | 75/245 |
| 4,960,471 | 10/1990 | Fife et al. | 148/20.3 |
| 4,964,906 | 10/1990 | Fife | 75/369 |
| 5,011,742 | 4/1991 | Fife et al. | 428/558 |
| 5,211,741 | 5/1993 | Fife | 75/255 |
| 5,242,481 | 9/1993 | Kumar | 75/364 |
| 5,261,942 | 11/1993 | Fife et al. | 75/342 |
| 5,605,561 | 2/1997 | Iwabuchi | 75/364 |

Primary Examiner—Samuel M. Heinrich
Assistant Examiner—M. Alexandra Elve

[57] ABSTRACT

A method for controlling oxygen in valve metal materials. The method includes deoxidizing a valve metal material, typically tantalum, niobium, or alloys thereof, and leaching the material in an acid leach solution at a temperature lower than room temperature. In one embodiment of the present invention, the acid leach solution is prepared and cooled to a temperature lower than room temperature prior to leaching the deoxidized valve metal material. The method of the present invention has been found to lower both the oxygen and fluoride concentrations in valve metal materials, as the use of reduced acid leach temperatures provide lower oxygen for a given quantity of a leach acid, such as hydrofluoric acid.

36 Claims, No Drawings

METHOD FOR CONTROLLING THE OXYGEN CONTENT IN VALVE METAL MATERIALS

BACKGROUND OF THE INVENTION

1. Field of Invention

The present invention relates to a method of controlling the oxygen content in valve metal materials and, more particularly, to a method of controlling the oxygen content in powders of tantalum, niobium, and alloys thereof, useful in the production of capacitors, and in sintered anode bodies made from tantalum, niobium, and alloys thereof.

2. Description of the Related Art

Valve metals may be used to form wrought products, such as bars, plates, sheets, wires, tubes and rods, and preforms for subsequent thermo-mechanical processing. In addition, capacitors can be manufactured by compressing agglomerated tantalum powders to form a pellet, sintering the pellet in a furnace to form a porous body (electrode), which is sometimes followed by deoxidation of the electrode by reaction with a reactive metal, such as magnesium, and then subjecting the body to anodization in a suitable electrolyte to form a continuous dielectric oxide film on the sintered body.

As is known to those skilled in the art, valve metals generally include tantalum, niobium, and alloys thereof, and also may include metals of Groups IVB, VB, and VIB and alloys thereof. Valve metals are described, for example, by Diggle, in "Oxides and Oxide Films", Vol. 1, pages 94–95, 1972, Marcel Dekker, Inc., New York.

Tantalum and niobium are generally extracted from their ores in the form of powders. Tantalum powders, for example, that are suitable for use in high performance capacitors, can be produced by chemical reduction, such as sodium reduction, of potassium fluorotantalate. In this process, the potassium fluorotantalate is recovered from processed ore in the form of a dry crystalline powder. The potassium fluorotantalate is melted and reduced to tantalum metal powder by sodium reduction. The tantalum powder formed is then water washed and acid leached. Dried tantalum powder is then recovered, thermally agglomerated at temperatures up to about 1500° C., and crushed to a granular consistency. Typically, the granular powder is then deoxidized in the presence of a getter material having a higher affinity for oxygen than the valve metal at elevated temperatures up to about 1000° C., and is then acid leached to remove residual metal contaminants and their oxides. The powder is then dried, compressed to form a pellet, sintered to form a porous body, and subjected to anodization in a suitable electrolyte to form a continuous dielectric oxide film on the sintered body. In an alternative method, the powder is produced by hydriding a melted tantalum ingot, milling the hydrided chips, and dehydriding. In all cases it is possible, and sometimes desirable, to deoxidize the sintered anode pellet in a process similar to that described above for the powder.

Valve metal powders, particularly powders of tantalum, niobium, and their alloys, that are suitable for making capacitors should provide an adequate electrode surface area when compressed and sintered. The ufV/g of the capacitor is proportional to the surface area of the sintered porous body. The greater the specific surface area after the sintering operation, the greater the ufV/g. The purity of the powder is also an important consideration in its use in capacitor production. Metallic and non-metallic contamination can degrade the dielectric oxide film on the capacitors. While high sintering temperatures can be used to remove some volatile contaminants, the high temperatures may also shrink the porous body and its net specific surface area and, therefore, the capacitance of the resulting capacitor. Therefore, it is important to minimize the loss of specific surface area under sintering conditions.

In the production of tantalum capacitors, for example, tantalum powder is typically heated under vacuum to cause agglomeration of the powder while avoiding oxidation of the tantalum. Following this treatment, however, the tantalum powder often picks up a considerable amount of additional oxygen because the initial surface layer of oxide goes into solution in the metal during the heating and a new surface layer forms upon subsequent exposure to air, thereby adding to the total oxygen content of the powder. During the later processing of these powders into anodes for capacitors, the dissolved oxygen may recrystallize as a surface oxide and contribute to voltage breakdown or high current leakage of the capacitor by shorting through the dielectric layer of amorphous oxide.

As the technology of capacitors is continually demanding higher surface area valve metal powders, the requirement for oxygen management exceeds the effectiveness of the available methods of oxygen control. Accordingly, the electrical properties of capacitors could be improved if the oxygen content could be controlled, i.e., decreased or maintained about constant, during the powder processing.

One method to deoxidize valve metal powders, such as tantalum powder, is to mix alkaline earth metals, aluminum, yttrium, carbon, and tantalum carbide with the tantalum powder. However, the alkaline earth metals, aluminum, and yttrium form refractory oxides that must be removed, such as by acid leaching, before the material can be used to produce capacitors. Typically, the post-deoxidation acid leaching is performed using a strong mineral acid solution including, for example, hydrofluoric acid, at elevated temperatures of up to 100° C. to dissolve the refractory oxide contaminants. The carbon content must be controlled because it may also be deleterious to capacitors even at levels as low as 50 ppm. Other methods have been proposed, including using a thiocyanate treatment, or a reducing atmosphere throughout the tantalum powder processing, to prevent oxidation and provide low oxygen content.

Other processes for controlling the oxygen content of valve metal materials, such as tantalum, niobium, and their alloys, include the use of getter materials. For example, Hard, in U.S. Pat. No. 4,722,756, describes heating the materials in an atmosphere containing hydrogen gas in the presence of a metal, such as zirconium or titanium, that is more oxygen active than tantalum or niobium. Another process for controlling the oxygen content of valve metal materials is disclosed by Fife, in U.S. Pat. No. 4,964,906. This process involves heating a tantalum material in a hydrogen-containing atmosphere in the presence of a tantalum getter metal having an oxygen concentration lower than the tantalum material. While these processes provide some control of the oxygen content of valve metal materials, there is a desire to improve the electrical properties of valve metal capacitors, particularly those formed from tantalum, niobium, and alloys thereof, by controlling, i.e., decreasing or maintaining about constant, the oxygen content of the valve metal powders. Accordingly, a demand exists for process improvements to reduce the oxygen content of these materials, particularly after they have been subjected to a deoxidation process.

In addition to the problems with powders and capacitor applications, high oxygen contents in fabricated wrought products of valve metals can decrease the ductility of the products.

It is therefore an object of the present invention to provide a method of controlling the oxygen content in valve metal materials. It is another object of the present invention to provide a method of controlling the oxygen content in valve metal powders, such as tantalum, niobium, and alloys thereof, useful in the production of capacitors, particularly after the powders have been subjected to a deoxidation process.

SUMMARY OF THE INVENTION

Accordingly, the present invention is directed to a method of controlling the oxygen content in valve metal materials, such as powders of tantalum, niobium, and their alloys. The method includes leaching a deoxidized valve metal material in an acid leach solution at a temperature lower than room temperature. In one embodiment, the method for controlling the oxygen content in valve metal materials includes deoxidizing a valve metal material, preparing and cooling an acid leach solution to a temperature lower than room temperature, and leaching the deoxidized valve metal material in the cooled acid leach solution. The method of the present invention has been found to lower both the oxygen and fluoride concentrations in valve metal materials, as the use of reduced acid leach temperatures provide lower oxygen for a given quantity of a leach acid, such as hydrofluoric acid.

Another aspect of the present invention is directed to a method of producing a valve metal material, such as tantalum, niobium, and alloys thereof, having a controlled oxygen content. The method includes forming a valve metal powder, and agglomerating the powder. The agglomerated valve metal powder is then deoxidized in the presence of a getter material that has a higher affinity for oxygen than the valve metal. The deoxidized valve metal is then leached in an acid leach solution at a temperature lower than room temperature to remove any getter material contaminants. In a further aspect of the invention, the leached valve metal powder is washed and dried. The powder is then compressed to form a pellet, that is sintered to form a porous body. The body is then anodized in an electrolyte to form a dielectric oxide film on the pellet surface. In another aspect of the present invention, a sintered body is reacted with a getter (reactive) material, such as magnesium, that has a higher affinity for oxygen than the valve metal. The sintered body is then leached in an acid leach solution at a temperature lower than room temperature, and anodized in an electrolyte to form an oxide film.

DETAILED DESCRIPTION OF THE INVENTION

The present invention is directed to a method for controlling, i.e., decreasing or maintaining about constant, the oxygen content in valve metal materials, such as tantalum, niobium, and their alloys, that are useful in the production of capacitors, sintered anode bodies, and wrought products made from tantalum, niobium, and alloys thereof. The method includes leaching a deoxidized valve metal material in an acid leach solution at a temperature lower than room temperature.

As noted above, capacitor grade valve metal powders can be produced by several methods, including the chemical reduction of their ores, or by electron beam or vacuum arc melting of a valve metal ingot. In the chemical reduction of a valve metal powder, such as tantalum powder, potassium fluorotantalate is recovered, melted and reduced to tantalum metal powder by sodium reduction. Dried tantalum powder is then recovered, thermally agglomerated under vacuum to avoid oxidation of the tantalum, and crushed. Because the oxygen concentration of the valve metal material is critical in the production of capacitors, the granular powder is then deoxidized at temperatures up to about 1000° C. in the presence of a getter material, such as magnesium, that has a higher affinity for oxygen than the valve metal. The powder is then acid leached to remove contaminants, including magnesium and magnesium oxide, before the material is used to produce capacitors. Typically, the acid leaching is performed using a strong mineral acid solution including, for example, hydrofluoric acid, nitric acid, sulfuric acid, hydrochloric acid, and the like, at elevated temperatures of up to 100° C. to dissolve any metal and metal oxide contaminants. Preferably, nitric acid and/or hydrofluoric acid are used in the leach solution due to their ability to dissolve most metal and metal oxide contaminants, as well as valve metal fines. The powder is then washed and dried, compressed to form a pellet, sintered to form a porous body, and anodized in a suitable electrolyte to form a continuous dielectric oxide film on the sintered body. In some cases the sintered body is deoxidized with magnesium in a process similar to the powder treatment prior to being anodized.

The deoxidation process is typically followed by a mineral acid leaching process to dissolve any contaminants. In addition, it is further recognized that the leach solution, including hydrofluoric acid, may further lower the oxygen concentration by dissolving very small valve metal particles (fines). However, use of hydrofluoric acid may provide an undesirable increase in the fluoride concentration on the resulting particle and, accordingly, undesirable corrosion on process equipment. Typically, the mineral acid solution contains less than 10%, by weight, hydrofluoric acid. Preferably, less than 5%, by weight, of hydrofluoric acid is used in the acid leach solution to dissolve residual metal and metal oxide contaminants while minimizing fluoride concentration; most preferably, less than 1%, by weight, of hydrofluoric acid is used. It is noted, however, that a leach solution containing no hydrofluoric acid, so as to eliminate fluoride contamination, is also desirable, provided the solution is effective at lowering the oxygen concentration of the valve metal particles by dissolving contaminants and fines.

Elevated temperatures (above room temperature to about 100° C.) are traditionally used during the post-deoxidation acid leach to increase the activity of the acid solution in dissolving any residual metal and metal oxide contaminants, such as magnesium and magnesium oxide, on the valve metal material. The high temperature post-deoxidation acid leach also etches the valve metal particles and increases their surface area, thereby resulting in an undesirable increase in oxygen concentration upon subsequent exposure to the atmosphere. As a result, further processing may be necessary to control the oxygen concentration of the valve metal materials to ensure their suitability for capacitor and related applications.

The process of the present invention, however, performs the post-deoxidation acid leaching at temperatures lower than room temperature to minimize the leach effect on the particle surface area, i.e. remove the residual metal and metal oxide contaminants while controlling deleterious etching, and the increase in the oxygen concentration, of the valve metal materials. As known to those skilled in the art, "room temperature" generally means an indoor temperature of between about 20° C. and about 25° C. (between about 68° F. and about 77° F.). Because the chemical reactions during acid leaching are exothermic, the starting leach temperature is often the lowest temperature in the process;

it may be measured prior to the addition of the valve metal, after the addition of the valve metal, or during the acid leaching. Most typically, the leach temperature is the acid leach solution temperature prior to the addition of the valve metal material. In the cases of the present examples (described below) the acid leach temperature is defined as the temperature of the acid leaching solution prior to the addition of the deoxidized valve metal material.

It should be understood that lowering the temperature at the start of the acid leach procedure results in a generally lower temperature throughout the process than would have been measured if the solution was at, or greater than, room temperature prior to the addition of the valve metal material. For large scale leaches, wherein a large amount of heat energy will be liberated, active cooling must be employed to extract the heat. In a small scale acid leach, the reactants (leach solution and/or valve metal material) can be cooled prior to being mixed to effectively extract the heat. The acid leach solution is prepared and cooled using techniques known to those skilled in the art. For example, the acid solution, and/or the valve metal material, may be precooled, the acid leaching container may be precooled, and/or ice may be added to the acid leach solution after the solution has been added to a leach container. It has been found that acid leach solutions at temperatures substantially below room temperature are most effective to remove residual metal and metal oxide contaminants while controlling the resulting oxygen concentration of the valve metal materials. A preferred acid leach solution temperature is below about 25° C.; most preferably, the acid leach solution temperature is below about 0° C. to effectively remove the heat of reaction between the acid leach solution and the residual metal and metal oxide contaminants, and slow the leach solution effect on the surface of the valve metal material.

Although the process of the present invention is effective to control undesirable oxygen concentrations, it is noted that a minimum concentration of oxygen will remain on the valve metal particles during normal processing due to their high affinity for oxygen. This level will typically be sufficient to passivate the surface of the particle. In the production of capacitor grade valve metal powders, lower levels of oxygen on the valve metal particles are preferred. For example, tantalum powders for use in capacitors preferably have less than 3000 ppm, and more preferably less than 2400 ppm, oxygen. Similar levels of oxygen on sintered tantalum electrode bodies have been found to be acceptable.

The present invention will be further illustrated by the following examples which are intended to be illustrative in nature and are not to be considered as limiting the scope of the invention.

EXAMPLE I

Variations in the concentration of the hydrofluoric acid (HF), the concentration of the nitric acid ($HNO_3$), and the temperature of a post-deoxidation acid leach of a tantalum powder was evaluated.

The HF concentration (ml/lb of tantalum powder leached), leach temperature (° C.), and $HNO_3$ concentration (wt %) were varied to determine the optimum leaching conditions. These factors were varied using C255 grade tantalum powder, available from the Cabot Performance Materials Division of Cabot Corporation, Boyertown, Pa. The C255 grade tantalum powder is a mid- to high- voltage flaked powder for use at 15,000 to 18,000 CV/g.

The tantalum powder was prepared by first cooling a 600 milliliter plastic leach container by placing it in stainless steel tray containing a bath of ice cubes and coarse salt. About 250 milliliters of deionized water was added to the leach container. About 125 milliliters of a reagent grade $HNO_3$, having a concentration of between about 68% and about 70%, was then added into the leach container slowly under agitation. A 2 inch diameter plastic coated propeller-type agitator, set at about 425 rpm, was used to mix the liquids. The temperature of the $HNO_3$/water was cooled to, and maintained at, about 20° C. After the desired temperature was achieved, about 1 pound of C255 grade flaked tantalum powder was added into the leach container during agitation. Prior to its addition to the leach container, the tantalum powder was subjected to a magnesium deoxidation process. After the tantalum addition, about 5 milliliters of a reagent grade HF, having a concentration of between about 48% and about 51%, was then added into the leach container slowly under agitation. After the HF addition, the leach container contents were mixed for about 30 minutes.

After the tantalum powder was leached for about 30 minutes, the agitator was turned off and the temperature was measured to be about 5° C. The tantalum powder was then allowed to settle, and the acid was decanted. The tantalum powder was then transferred into a 4,000 milliliter plastic container and washed using room temperature deionized water. The tantalum powder was then allowed to settle, and the wash water was decanted. The washing step was repeated until the conductivity of the decanted wash water was less than 10μMohs/cm. The water conductivity was measured using a Cole-Parmer Model 1500-00 conductivity meter.

After the desired water conductivity was reached, the tantalum solution was filtered using a Buchner funnel, filter paper, and a vacuum pump. The damp tantalum powder was recovered and transferred into a stainless steel pan. The powder was then dried in a vacuum oven at about 180° F. (about 82° C.) for about 6 hours. The dried tantalum powder was then screened through a 50 mesh sieve and analyzed. The foregoing process was repeated using portions from the same blended lot of deoxidized tantalum powder, varying the HF concentration, leach temperature (defined as the $HNO_3$/water solution temperature prior to tantalum addition), and $HNO_3$ concentration, to determine the optimum leaching conditions to control oxygen content in tantalum powder. The ranges of each variable (including HF, $HNO_3$, and leach temperature) and the experimental results (fluoride and oxygen concentration, and BET surface area measured using ASTM method D4567 continuous $N_2$ flow) are listed below in Table 1.

TABLE 1

| Sample No. | HF (ml/lb Ta) | $HNO_3$ (wt %) | Temp. (° C.) | F (ppm) | Oxygen (ppm) | BET ($m^2$/g) |
|---|---|---|---|---|---|---|
| 1 | 1 | 23.000 | 20 | 24 | 1888 | 0.52 |
| 2 | 1 | 70.000 | 20 | 32 | 2061 | 0.55 |
| 3 | 5 | 23.000 | 20 | 69 | 1433 | 0.44 |
| 4 | 5 | 70.000 | 20 | 131 | 1498 | 0.51 |
| 5 | 1 | 23.000 | 80 | 37 | 2490 | 0.79 |
| 6 | 1 | 70.000 | 80 | 35 | 2491 | 0.86 |
| 7 | 5 | 23.000 | 80 | 144 | 2725 | 1.19 |
| 8 | 5 | 70.000 | 80 | 301 | 4183 | 2.00 |

As reported in Table 1, a reduced temperature acid leach results in controlled oxygen content in the final tantalum powder. Samples 1 through 4 were evaluated at an acid leach temperature of 20° C., while varying the HF content between 1 and 5 milliliter HF per pound of tantalum (Samples 1 and 2, and Samples 3 and 4, respectively), and adjusting the $HNO_3$ concentration between 23.0 and 70.0 percent, by weight, between samples. As expected, of the Samples 1 through 4, a lower oxygen content was measured with the Sample 3 and 4 tantalum materials due to the additional HF content, which dissolved the smallest tantalum particles (fines) from the tantalum material. It is noted that each of the Samples 1 through 4, utilizing a reduced temperature leach, controlled the oxygen content to acceptable levels (less than about 2100 ppm oxygen). The materials produced with less HF addition are preferred. The adjustment of the $HNO_3$ concentration (between Samples 1 and 2, and 3 and 4) appears to have only a minimal effect upon the oxygen content of the final tantalum powder.

Samples 5 through 8 were evaluated at an acid leach temperature of 80° C., while varying the HF content between 1 and 5 milliliter HF per pound of tantalum (Samples 5 and 6, and Samples 7 and 8, respectively), and adjusting the $HNO_3$ concentration between 23.0 and 70.0 percent, by weight, between samples. Each of these Samples exceeded an oxygen range of about 2400 ppm. However, a lower oxygen content was measured with the Sample 5 and 6 tantalum materials that utilized a lower HF content because, at high temperature, the increase in surface area due to etching by HF predominates over the removal of very small particles.

The overall results indicate that the fluoride level of the final powder is determined by the amount of HF used in the acid leach. Moreover, as expected, the surface areas of the particles are proportional to the oxygen content of the final powder.

Therefore, it is seen that the use of low leach temperatures is important to lower both oxygen and fluoride together, because low temperature provides lower oxygen for a given HF amount, and the lowest possible HF amount is needed to control the fluoride content in the final powder.

EXAMPLE II

Variations in the concentration of the hydrofluoric acid (HF) (ml/lb of tantalum powder leached), and the temperature of a post-deoxidation acid leach of a tantalum powder was evaluated to determine the optimum leaching conditions to control the oxygen content of the powder.

These factors were varied using C515 grade tantalum powder, available from the Cabot Performance Materials Division of Cabot Corporation, Boyertown, Pa. The C515 grade tantalum powder is a low- to mid-voltage nodular-shaped powder for use at 35,000 to 45,000 CV/g.

The tantalum powder was prepared by premixing 1 liter of reagent grade $HNO_3$, having a concentration of between about 68% and about 70%, and about 2 liters of deionized water in a container. The temperature of the $HNO_3$/water solution was cooled by placing the container in a foam chest containing a bath of ice cubes and coarse salt A plastic coated steel barrel with baffles, used as a leach container, having a volume of about 100 liters, was then prechilled by adding between about 8 and 10 pounds of ice and enough deionized water to cover the ice in the leach container. The container was then rotated for about 10 minutes, the ice/water was poured off, and the container was rinsed with deionized water. The $HNO_3$/water solution temperature was then measured with a thermocouple to be about 0° F. (about −16° C.). The $HNO_3$/water solution was then added to the prechilled leach container, and about 5 pounds of C515 grade nodular tantalum powder was added into the leach container during agitation. Prior to its addition to the leach container, the tantalum powder was subjected to a magnesium deoxidation process, and was screened to about −50 mesh to remove any lumps. After the tantalum addition, a reagent grade HF, having a concentration of between about 49% and about 51%, was then added into the leach container slowly under agitation. After the HF addition, the leach container contents were mixed for about 30 minutes.

After the tantalum powder was leached for about 30 minutes, the agitator was turned off. The tantalum powder was then allowed to settle for about 10 minutes after additional deionized water was added, and the acid/water was decanted. The tantalum powder was then washed using room temperature deionized water, and a 2 minute rotation period. The tantalum powder was then allowed to settle, and the wash water was decanted. The washing step was repeated until the conductivity of the decanted wash water was less than 10 µMohs/cm. The water conductivity was measured using a Cole-Parmer Model 1500-00 conductivity meter.

After the desired water conductivity was reached, the water was decanted and the tantalum powder was filtered. The damp tantalum powder was recovered and transferred into a stainless steel pan. The powder was then dried in a vacuum oven set at about 180° F. (about 82° C.) for about 6 hours. The foregoing process was repeated, varying the HF concentration, and the leach temperature (defined as the $HNO_3$/water solution temperature prior to tantalum addition) to determine the optimum leaching conditions to control oxygen content in tantalum powder. The ranges of each variable (including HF and leach temperature), and the experimental results (fluoride and oxygen concentration, and BET surface area measured using ASTM method D4567 continuous $N_2$ flow) are listed below in Table 2.

TABLE 2

| Sample No. | HF (ml/lb Ta), | Temperature (° C.) | F (ppm) | BET ($m^2$/g) | Oxygen (ppm) |
|---|---|---|---|---|---|
| 1 | 1 | −12.0 | <60.0 | 0.63 | 2289 |
| 2 | 5 | −16.0 | 88.0 | 0.71 | 2021 |
| 3 | 1 | 31.0 | <68.0 | 0.81 | 2742 |
| 4 | 5 | 33.0 | 112.0 | 0.69 | 1884 |

As reported in Table 2, a reduced temperature acid leach results in controlled oxygen content in the final tantalum powder. Samples 1 and 2 were evaluated using 1 and 5 milliliter HF per pound of tantalum, respectively, at acid leach temperatures of −12.0° C. and −16.0° C. As expected, a lower oxygen content was measured with the Sample 2 tantalum material due to the additional HF content, which dissolved additional small tantalum particles. As a result of the additional HF, however, the fluoride content of the Sample 2 tantalum material is higher. Because the oxygen content of Samples 1 and 2 is controlled, the material produced with reduced HF content (Sample 1) is preferred due to the lower resulting fluoride content.

Although the lowest oxygen content was measured with the Sample 4 tantalum material, it is a result of the high level of HF in the leach solution and, accordingly, the reduced surface area. An undesirably high level of fluoride was also measured in Sample 4. As noted above, elevated temperatures are known to increase the activity of the acid solution in dissolving contaminants on the valve metal material. The combination of increased HF content at an elevated temperature in Sample 4, however, resulted in reduced surface area. A lower quantity of HF in the acid leach solution at an elevated temperature in Sample 3 resulted in an increase in surface area because the particle surface was etched and not dissolved. This increase in surface area resulted in an oxygen content of more than 2700 ppm.

The foregoing results also confirm that the fluoride level is determined by the amount of HF used in the acid leach. The same quantity of HF (1 ml/lb Ta) was used in Samples 1 and 3, and Samples 2 and 4, while varying the leach temperature. As reported, while reduced temperatures lower the oxygen content to acceptable levels, the fluoride content was only marginally reduced. It is noted, however, that varying the HF content, as between Samples 1 and 2, and Samples 3 and 4 (1 and 5 ml/lb Ta, respectively) and using reduced temperatures for Samples 1 and 2, and elevated temperatures for Samples 3 and 4, resulted in higher fluoride levels in Samples 2 and 4, which used higher levels of HF in the acid leach solution.

Therefore, it is seen that the use of reduced acid leach solution temperatures is important to lower both oxygen and fluoride together, because low temperatures provide lower oxygen for a given HF amount, and the lowest possible HF amount is needed to control the fluoride content in the final powder.

EXAMPLE III

Variations in the temperature of a post-deoxidation acid leach of a niobium powder was evaluated to determine the optimum leaching conditions to control the oxygen content of the powder.

The temperature of the acid leach was varied using a deoxidized WCb-C grade niobium powder, available from the Cabot Performance Materials Division of Cabot Corporation, Boyertown, PA. The WCb-C grade niobium powder is an ingot-derived, low surface area powder. The WCb-C grade niobium powder was first deoxidized by blending a 1 kilogram sample with 0.4% magnesium in a tantalum tray. The tray was then covered, placed into a retort, and heated in a furnace at a temperature of 750° C. in an argon atmosphere, for about 1 hour. After this period, a vacuum was applied to the retort, the argon was removed, and a final pressure of less than about 400 microns was achieved and held for about 1 hour. The retort was then cooled to a temperature of less than about 200° C., and was removed from the furnace. After the system cooled to a temperature of less than about 40° C., it was passivated by adding air before opening the retort and removing the niobium powder. The resulting deoxidized niobium powder had an oxygen content of 1767 ppm.

The deoxidized niobium powder was then treated in three different temperature acid leaches to determine the effectiveness of the acid leach temperature on controlling the oxygen content of the powder. The acid leach solution was prepared by premixing about 55 milliliters of reagent grade $HNO_3$, having a concentration of between about 68%, and about 110 milliliters of deionized water (resulting in a 165 ml solution of 23% $HNO_3$) in a 250 milliliter plastic container. About 100 grams of the deoxidized WCb-C grade niobium powder was then added to the leach container during agitation. After the niobium powder addition, about 0.9 milliliter of a reagent grade HF, having a concentration of about 49%, was then added into the leach container slowly under agitation. After the HF addition, the leach container contents were mixed for about 30 minutes.

After the niobium powder was leached for about 30 minutes, the agitator was turned off. The niobium powder was then allowed to settle for about 10 minutes after additional deionized water was added, and the acid/water was decanted. The niobium powder was then washed using room temperature deionized water. The niobium powder was then allowed to settle, and the wash water was decanted. The washing step was repeated until the conductivity of the decanted wash water was less than 10 $\mu$Mohs/cm.

After the desired water conductivity was reached, the water was decanted and the niobium powder was filtered. The damp niobium powder was then recovered and dried in a vacuum oven at about 85° C. The foregoing process was repeated, varying the leach temperature (defined as the $HNO_3$/water solution temperature prior to niobium powder addition) to determine the optimum leaching temperature to control oxygen content in niobium powder. The niobium powder was added to the 23% $HNO_3$ solution at temperatures of about 30° C., about 3° C., and about 55° C. The 3° C. acid leach solution was prepared by cooling the 23% $HNO_3$ solution in an ice/salt bath; the 55° C. acid leach solution was prepared by using heated deionized water (about 60° C.) to form the acid/water leach solution, and using a hot water bath (between about 45° C. and about 50° C.) to maintain the elevated temperature. The experimental results (oxygen concentration) are listed below in Table 3.

TABLE 3

| Sample No. | Oxygen (ppm) (30° C.) | Oxygen (ppm) (3° C.) | Oxygen (ppm) (55° C.) |
| --- | --- | --- | --- |
| 1 | 379 | 234 | 773 |
| 2 | 595 | 558 | 1007 |
| 3 | 648 | 574 | 968 |
| 4 | 558 | 431 | 791 |
| 5 | 672 | 567 | 962 |
| Average | 570 | 473 | 900 |

As reported in Table 3, a cooled acid leach solution results in reduced oxygen content in the final niobium powder. The powder that was leached in the 3° C. acid leach solution had an average oxygen content of 473 ppm, which was about 100 ppm less than the powder that was leached in the 30° C. acid leach solution. The powder that was leached in the warmest acid solution (about 55° C.) had an average oxygen content of 900 ppm, which is 330 ppm more than the powder that was leached at near-ambient temperature, and almost double the oxygen content of the powder that was leached in the coldest acid leach solution. Therefore, the use of reduced acid leach temperatures is important to control (lower) the oxygen content in deoxidized valve metal materials such as niobium powder.

EXAMPLE IV

Variations in the temperature of an acid leach of a non-deoxidized tantalum powder was evaluated to determine the optimum leaching conditions to control the oxygen content of the powder.

The temperature of the acid leach was varied using a non-deoxidized C275 grade tantalum powder, available from the Cabot Performance Materials Division of Cabot Corporation, Boyertown, Pa. The non-deoxidized tantalum powder had an oxygen content of 8913 ppm.

The acid leach solution was prepared by premixing about 33 milliliters of reagent grade $HNO_3$, having a concentration of between about 68%, and about 66 milliliters of deionized water (resulting in a 99 ml solution of 23% $HNO_3$) in a 250 milliliter plastic container. A cold leach solution (about −3° C.) was prepared by cooling the 23% $HNO_3$ solution in an ice/salt bath. About 120 grams of the non-deoxidized C275 grade tantalum powder was added to the leach container during agitation. After the tantalum powder addition, about 0.3 milliliter of a reagent grade HF, having a concentration of about 49%, was then added into the leach container slowly under agitation. After the HF addition, the leach container contents were mixed for about 30 minutes. A second leach solution (about 37° C.), prepared by using warm deionized water, was also evaluated to treat about 120 grams of the non-deoxidized tantalum powder as described above.

After the tantalum powder was leached for about 30 minutes, the agitator was turned off. The tantalum powder was then allowed to settle for about 10 minutes after additional deionized water was added, and the acid/water was decanted. The tantalum powder was then washed using room temperature deionized water. The tantalum powder was then allowed to settle, and the wash water was decanted. The washing step was repeated until the conductivity of the decanted wash water was less than 10 $\mu$Mohs/cm.

After the desired water conductivity was reached, the water was decanted and the tantalum powder was filtered. The damp tantalum powder was then recovered and dried in a vacuum oven at about 85° C. The foregoing process was repeated for each leach solution to determine the optimum leaching temperature to control oxygen content in a non-deoxidized tantalum powder. The experimental results (oxygen concentration) are listed below in Table 4.

TABLE 4

| Sample No. | Oxygen (ppm) (−3° C.) | Oxygen (ppm) (37° C.) |
|---|---|---|
| 1 | 9037 | 8477 |
| 2 | 9112 | 8818 |
| 3 | 9198 | 8994 |
| 4 | 7599 | 8824 |
| 5 | 8794 | 8870 |
| Average | 8748 | 8797 |

As reported in Table 4, neither the cold nor the warm acid leach significantly lowered the oxygen content of the non-deoxidized tantalum powder. The powder that was leached in the reduced temperature acid leach solution had an average oxygen content of 8748 ppm, and the powder that was leached in the warmer solution had an average oxygen content of 8797 ppm. As noted above, the oxygen content of the starting non-deoxidized tantalum powder was 8913 ppm. The use of reduced acid leach temperatures, therefore, appears to be ineffective in controlling (lowering) the oxygen content in non-deoxidized valve metal materials such as tantalum powder.

EXAMPLE V

Variations in the temperature of an acid leach of a sintered tantalum anode was evaluated to determine the optimum leaching conditions to control the oxygen content of the anode.

The temperature of the acid leach was varied using sintered anodes made from HP110 finished tantalum powder, available from the Cabot Performance Materials Division of Cabot Corporation, Boyertown, Pa. The anodes weighed 476 grams each, with a press density of 5.0 g/cc, and were sintered at 1570° C. for 30 minutes. The anodes were cut into small pieces before leaching.

The acid leach solution was prepared by premixing about 10 milliliters of reagent grade HNO$_3$, having a concentration of between about 68%, and about 20 milliliters of deionized water (resulting in a 30 ml solution of 23% HNO$_3$) in a 100 milliliter plastic container. A cold leach solution (about −3° C.) was prepared by cooling the 23% HNO$_3$ solution in an ice/salt bath. About 3.5 grams of the tantalum anode pieces were added to the leach container during agitation. After the tantalum anode addition, about 0.05 milliliter of a reagent grade HF, having a concentration of about 49%, was then added into the leach container slowly under agitation. After the HF addition, the leach container contents were mixed for about 30 minutes. A second leach solution (about 42° C.), prepared by using warm deionized water, was also evaluated to treat about 3.5 grams of the tantalum anode pieces as described above.

After the tantalum anode pieces were leached for about 30 minutes, the agitator was turned off. The tantalum anode pieces were then allowed to settle for about 10 minutes after additional deionized water was added, and the acid/water was decanted. The tantalum anode pieces were then washed using room temperature deionized water. The tantalum anode pieces were then allowed to settle, and the wash water was decanted. The washing step was repeated until the conductivity of the decanted wash water was less than 10 $\mu$Mohs/cm.

After the desired water conductivity was reached, the water was decanted and the tantalum anode pieces were recovered and dried in a vacuum oven at about 85° C. The foregoing process was repeated for each leach solution to determine the optimum leaching temperature to control oxygen content in a sintered tantalum anodes. The experimental results (oxygen concentration) are listed below in Table 5.

TABLE 5

| Sample No. | Oxygen (ppm) Pre-Leach | Oxygen (ppm) (−3° C.) | Oxygen (ppm) (42° C.) |
|---|---|---|---|
| 1 | 2630 | 2435 | 2705 |
| 2 | 2432 | 2472 | 2401 |
| 3 | 2502 | 2486 | 2331 |
| 4 | 2444 | 2466 | 2390 |
| 5 | 2424 | 2543 | 2114 |
| 6 | 2488 | 2534 | 2309 |
| 7 | 2446 | 2619 | 2488 |
| 8 | 2651 | 2500 | 2438 |
| 9 | 2475 | 2651 | 2465 |
| 10 | 2552 | 2537 | 2491 |
| 11 | 2557 | 2604 | 2531 |
| 12 | 2605 | 1884 | 2617 |
| Average | 2517 | 2476 | 2441 |

As reported in Table 5, neither the cold nor the warm acid leach significantly lowered the oxygen content of the sintered tantalum anode pieces. The sintered tantalum anode pieces that were leached in the the reduced temperature acid leach solution had an average oxygen content of 2476 ppm, and the powder that was leached in the warmer acid leach solution had an average oxygen content of 2441 ppm. The average oxygen content of the sintered tantalum anode pieces was 2517 ppm. The use of reduced acid leach solution temperatures, therefore, appears to be ineffective in controlling (lowering) the oxygen content of sintered valve metal materials, such as tantalum anodes, relative to warmer acid leach solutions.

EXAMPLE VI

Variations in the temperature of an acid leach of an ingot-derived niobium powder was evaluated to determine the optimum leaching conditions to control the oxygen content of the powder.

The temperature of the acid leach was varied using a non-deoxidized, ingot-derived WCb-C niobium powder, available from the Cabot Performance Materials Division of Cabot Corporation, Boyertown, Pa. The powder was produced by hydriding and crushing a niobium ingot. The powder was then degassed in a vacuum oven.

The acid leach solution was prepared by first premixing about 55 milliliters of reagent grade $HNO_3$, having a concentration of between about 68%, and about 110 milliliters of deionized water (resulting in a 165 ml solution of 23% $HNO_3$) in a 250 milliliter plastic container. A cold leach solution (about 0° C.) was prepared by cooling the 23% $HNO_3$ solution in an ice/salt bath. About 200 grams of the niobium powder was added to the leach container during agitation. After the niobium powder addition, about 0.5 milliliter of a reagent grade HF, having a concentration of about 49%, was then added into the leach container slowly under agitation. After the HF addition, the leach container contents were mixed for about 30 minutes. A second leach solution (about 38° C.), prepared by using warmed deionized water, was also evaluated to treat about 200 grams of the niobium powder as described above.

After the niobium powder was leached for about 30 minutes, the agitator was turned off. The niobium powder was then allowed to settle for about 10 minutes after additional deionized water was added, and the acid/water was decanted. The niobium powder was then washed using room temperature deionized water. The niobium powder was then allowed to settle, and the wash water was decanted. The washing step was repeated until the conductivity of the decanted wash water was less than 10 $\mu$Mohs/cm.

After the desired water conductivity was reached, the water was decanted and the niobium powder was filtered. The damp niobium powder was recovered and was dried in a vacuum oven at about 85° C. The foregoing process was repeated for each leach solution to determine the optimum leaching temperature to control oxygen content in an ingot derived niobium powder. The experimental results (oxygen concentration) are listed below in Table 6.

TABLE 6

| Sample No. | Oxygen (ppm) Pre-Leach | Oxygen (ppm) (0° C.) | Oxygen (ppm) (38° C.) |
| --- | --- | --- | --- |
| 1 | 2337 | 1883 | 1636 |
| 2 | 2481 | 1925 | 1777 |
| 3 | 2412 | 2045 | 1874 |
| 4 | — | 2060 | 1984 |
| 5 | — | 1582 | 1511 |
| Average | 2410 | 1899 | 1756 |

As reported in Table 6, the cold acid leach did not significantly lower the oxygen content of the ingot-derived niobium powder relative to the warmer acid leach. The powder that was leached in the the reduced temperature acid leach solution had an average oxygen content of 1899 ppm, and the powder that was leached in the warmer acid leach solution had an average oxygen content of 1756 ppm. The average oxygen content of the ingot-derived niobium powder was 2410 ppm. The use of reduced acid leach solution temperatures, therefore, appears to be ineffective in controlling (lowering) the oxygen content of non-deoxidized, ingot-derived valve metal materials, such as niobium powder, relative to warmer acid leach solutions.

Although particular embodiments of the invention have been described in detail for purposes of illustration, various changes and modifications may be made without departing from the scope and spirit of the invention. For example, the process of the present invention may also be used to control the oxygen content of wrought products of valve metals. Accordingly, the invention is not to be limited except as by the appended claims.

What is claimed is:

1. A method for controlling the oxygen content in valve metal materials, comprising:

leaching a deoxidized valve metal material in an acid leach solution at a temperature less than about 0° C.

2. The method of claim 1, wherein said valve metal is selected from the group consisting of tantalum, niobium, alloys of tantalum, and alloys of niobium.

3. The method of claim 2, wherein said valve metal is tantalum.

4. The method of claim 2, wherein said valve metal is niobium.

5. The method of claim 1, wherein said valve metal material is selected from the group consisting of nodular powders, flaked powders, ingot-derived powders, and sintered bodies.

6. The method of claim 1, wherein said acid leach solution comprises a mineral acid.

7. The method of claim 6, wherein said acid leach solution comprises less than 10%, by weight, hydrofluoric acid.

8. The method of claim 1, wherein said acid leaching solution temperature is less than about −16° C.

9. A method of producing a valve metal material having a controlled oxygen content, comprising the steps of:

forming a valve metal powder;

agglomerating said valve metal powder;

deoxidizing said agglomerated valve metal powder in the presence of a getter material that has a higher affinity for oxygen than said valve metal powder; and leaching said deoxidized agglomerated valve metal powder in an acid leach solution at a temperature less than about 0° C. to remove getter material contaminants.

10. The method of claim 9, wherein said valve metal is selected from the group consisting of tantalum, niobium, alloys of tantalum, and alloys of niobium.

11. The method of claim 10, wherein said valve metal is tantalum.

12. The method of claim 10, wherein said valve metal is niobium.

13. The method of claim 9, wherein said valve metal powder is thermally agglomerated under vacuum.

14. The method of claim 9, wherein said valve metal powder is deoxidized at temperatures up to about 1000° C. in the presence of a getter material comprising magnesium.

15. The method of claim 9, wherein said acid leach solution comprises a mineral acid.

16. The method of claim 15, wherein said acid leach solution comprises less than 10%, by weight, hydrofluoric acid.

17. The method of claim 9, further comprising the steps of:

washing and drying said acid leached valve metal powder;

compressing said powder to form a pellet;

sintering said pellet to form a porous body; and anodizing said porous body in an electrolyte to form a continuous dielectric oxide film on said porous body.

18. The method of claim 17, further comprising the steps of:

deoxidizing said sintered porous body in the presence of a getter material that has a higher affinity for oxygen than said valve metal; and leaching said sintered porous body in an acid leach solution at a temperature less than about 0° C. to remove getter material contaminants prior to anodizing said porous body.

19. The method of claim 9, wherein said acid leaching solution temperature is less than about −16° C.

20. A method for controlling the oxygen content in valve metal materials, comprising:

leaching a deoxidized valve metal material in an acid leach solution at a temperature of about 0° C.

21. The method of claim 20, wherein said valve metal is tantalum.

22. The method of claim 20, wherein said valve metal is niobium.

23. The method of claim 20, wherein said valve metal material is selected from the group consisting of nodular powders, flaked powders, ingot-derived powders, and sintered bodies.

24. The method of claim 20, wherein said acid leach solution comprises a mineral acid.

25. The method of claim 24, wherein said acid leach solution comprises greater than 0 and less than 10%, by weight, hydrofluoric acid.

26. A method for controlling the oxygen content in valve metal materials, comprising:

leaching a deoxidized valve metal material in an acid leaching solution wherein the temperature of the acid leaching solution prior to the addition of the deoxidized valve metal material or at the start of the leaching process is less than about 0° C.

27. The method of claim 26, wherein said valve metal is selected from the group consisting of tantalum, niobium, alloys of tantalum, and alloys of niobium.

28. The method of claim 27, wherein said valve metal is tantalum.

29. The method of claim 27, wherein said valve metal is niobium.

30. The method of claim 26, wherein said valve metal material is thermally agglomerated under vacuum.

31. The method of claim 26, wherein said valve metal material is deoxidized at temperatures up to about 1000° C. in the presence of a getter material comprising magnesium.

32. The method of claim 26, wherein said acid leach solution comprises a mineral acid.

33. The method of claim 32, wherein said acid leach solution comprises less than 10%, by weight, hydrofluoric acid.

34. The method of claim 26, further comprising the steps of:

washing and drying said acid leached valve metal material;

compressing said material to form a pellet;

sintering said pellet to form a porous body; and anodizing said porous body in an electrolyte to form a continuous dielectric oxide film on said porous body.

35. The method of claim 26, further comprising the steps of:

deoxidizing said unanodized porous body in the presence of a getter material that has a higher affinity for oxygen than said valve metal; and leaching said unanodized porous body in an acid leach solution at a temperature less than about 0° C. to remove getter material contaminants prior to anodizing said porous body.

36. The method of claim 26, wherein said acid leach solution temperature is less than about −16° C.

* * * * *